(12) United States Patent
Tabe

(10) Patent No.: US 6,782,240 B1
(45) Date of Patent: Aug. 24, 2004

(54) MEGATEL COMMUNICATION INFORMATION SYSTEM

(76) Inventor: Joseph A Tabe, 525 Thayer Ave. Suite 315, Silver Spring, MD (US) 20910

( * ) Notice: Subject to any disclaimer, the term of this patent is extended or adjusted under 35 U.S.C. 154(b) by 0 days.

(21) Appl. No.: 09/559,330

(22) Filed: Apr. 27, 2000

(51) Int. Cl.$^7$ .................................................. H04B 7/00
(52) U.S. Cl. ....................... 455/66.1; 455/344; 455/345
(58) Field of Search ......................... 455/345, 66, 575, 455/90, 344, 351, 566, 568, 66.1

(56) References Cited

U.S. PATENT DOCUMENTS

| | | | | |
|---|---|---|---|---|
| 4,870,676 A | * | 9/1989 | Lewo | 379/428.01 |
| 5,418,836 A | * | 5/1995 | Yazaki | 379/428.01 |
| 5,722,069 A | * | 2/1998 | Donner | 381/86 |
| 5,978,689 A | * | 11/1999 | Tuoriniemi et al. | 455/351 |
| 5,991,637 A | * | 11/1999 | Mack et al. | 455/550 |
| 6,049,288 A | * | 4/2000 | Kawasaki | 248/27.1 |
| 6,085,078 A | * | 7/2000 | Stamegna | 455/345 |
| 6,154,658 A | * | 11/2000 | Caci | 455/466 |
| 6,314,094 B1 | * | 11/2001 | Boys | 370/352 |
| 6,401,085 B1 | * | 6/2002 | Gershman et al. | 707/4 |
| 6,420,975 B1 | * | 7/2002 | DeLine et al. | 340/425.5 |

* cited by examiner

*Primary Examiner*—Nay Maung
*Assistant Examiner*—Tan Trinh
(74) *Attorney, Agent, or Firm*—Krieg DeVault Lundy LLP

(57) ABSTRACT

An entertainment device for vehicles adaptable to include various telecommunication and Internet applications, a sun-viser monitoring screen for viewing, with an electronic screen protector for protecting the screen. The device, which is referred to as megatel, incorporates receivers and transmitters to enable cell phone and Internet transmission via the radio wave of an entertainment device radiated towards the antenna to the megatel body and output to the CPU. The signal to the CPU is controlled by the controller so that transmissions for the radio, the cell phone, and the Internet is separated and output to the monitoring screen and the speakers of the entertainment device so as to allow hands free communication while driving.

15 Claims, 7 Drawing Sheets

A BLOCK DIAGRAM AND SYMBOL FOR A SILCON CONTROLLED RECTIFIER

A SIMPLE SCR SWITCHING CIRCUIT

MEGATEL COMMUNICATION INFORMATION SYSTEM

This application claims priority based on U.S. Provisional Patent Application Serial No. 60/131,134, entitled "Mega Telecommunication Information System," and filed Apr. 27, 1999.

TECHNICAL FIELD

The present invention is directed to a cell phone and wireless Internet system and is particularly directed to a hands free cell phone communication while driving. The invention adopts an entertaining device advanced to incorporate communication and electronic transmission without further reducing the interior space of a vehicle.

BACKGROUND AND SUMMERY OF THE INVENTION

Cell phone usage has become increasingly useful to every individual and business, including automobile drivers. More people use cell phones for business transactions and also to reach love ones. Yet cell phone usage while driving is contributing heavily to about 70% of fatal accidents. Commonly, cell phone companies are advancing cell phone technology to incorporate many functions, inviting drivers to do many things with the cell phone, including Internet services. These things are environmentally destructive to drivers and have resulted to these many accidents. For these reasons, many states are enforcing no cell phone usage while driving to help prevent the live of many. Automobile manufacturers are also advancing devices in some vehicles to further distract good driving habits when enabled and these devices are reducing the interior space of the vehicle which is also environmentally unsafe to many. Attempts have been made to improve driving concentration while using cell phone. Still, these attempts are additions to the interior of the vehicle, which is still unsafe. It is the many reasons why this technology is developed to advance cell phone and Internet usage in vehicles and while driving, without accumulating any interior space, for the sole purpose of implementing safer cell phone and Internet usage.

Creation is the assembling and recording of ideas that could be put to use, to help improve our society and our way of life. The ideas, when put to useful form, are then arranged to fit our purpose. Purpose is our ability to use these ideas in the useful form to solve the problems around our community and us that are limiting the growth of our way of life. First a problem has to be identified and analyzed before solving. After the problem is solved, it must then be coded to address each problem variation. These codes could be text, signals, and symbols used to transmit messages around our work places, communities, businesses, and traffics. Electrical impulses, sound waves, and light signals are the typical system of coding the transportation and environmental informative messages. The computer, telephone and radio rely on these impulses to receive and transmit signals that will carry these messages to solve problems specific to our needs. The radio waves traveling through air or space are examples of this electrical energy and could be used to advance the telecommunication technologies. These impulses could be changed into sounds and be used to transfer, emit and absorb the coded information to and from different distant destinations. The radio produces sound waves from these electrical signals. The suggesting code is a vehicular means of transmitting these messages over crowded traffic and other locations without encouraging any accident. The source or sender of information must first encode the message while the receiver must decode the information for the information circuitry to be completed. By utilizing all these elements and concept, one can eliminate the many problems that our drivers face daily on the highways and inner cities communication while driving, which has resulted in many accidents, theft, car jacking, fatal injuries, and many deaths. It is for these many reasons that telecommunication technologies has to be looked on again, so that it could be further improved to address the uncovered areas and environmental safeties features on our traffics and highway or road safeties.

Road safety and safe driving are affected by some of the many utilized technologies that are available today. These technologies are disturbing the effective concentration of our city and highway drivers. Even so, there are still some lacking technologies that are still to be developed to assist in correcting the current disturbing factors in our driving habits that have resulted in many accidents and deaths. The ideas of people getting lost in inner cities and highways while driving, and trying to get help by exiting out of the highway, or going to the pay phone to demand help when lost, are bad ideas that have resulted in many car theft, car jacking, and many deaths. To add statistical findings to this concern, cell phones or mobile phones have contributed to many accidents in the United State. Still, these many drivers have no other options but to use their only and available source of help to seek for solutions when in need. A lot of women have been victimized by these ideas to the point that, even to ask for directions in some cities is not encouraging for them. That is why some of the disturbing factors like cellular-phones are being used instead, to call for those we know for directions. Still, car phones or cellular phones have a lot of negative safety implications attached to its usage while driving. Some of the negatives with the cellular phone are that, cellular phones have caused many accidents by drivers using it while driving, and these behaviors have resulted in many fatalities and deaths. The reasons for these many accidents is that, when a driver is carrying a conversation and driving at the same time, the driver is forced to use one hand to control the steering wheel and the other hand to control the position of the cellular phone against the head. When the driver is in the pick of the conversation, the concentration level to safely control the cellular phone and also have a better control and vision to safely control the steering wheel is gone. If some car suddenly stops in front of this car, the driver will have no other option but be forced to collide with the other vehicle because there was some lack of concentration and the driving literature was lost in between. However, these types of driving habits have some accidental records of their own, with many fatalities and deaths. In all, people still choose to use cellular phones while driving because of their businesses and to reach their love ones at all times. Still, this means can better be improved to further eliminate the involved safety hazards. It is also true that in emergency cases, cellular phones have been more than helpful. Now, the question is; how much money are we spending on cellular phone calls in and within the cities? How can accidents caused by cellular phones be reduced? Or how can cellular phones be improved to cut down on these accidents? How can we get external help with the cellular phone without any lost of time to our prospective destinations? Is cellular phone or car phoning the only option or can it be improved? People are spending lots of money on car phones with very limited airtime. This is because of the options they have, and that is why newer technologies have to be developed to further improve on the air time rate and to better the road safety issues and other informative system that is needed in the super highway.

Drivers around the world would enjoy and appreciate the luxury of driving and making calls with their hands fully in control of the steering wheel if it is made possible. That is, with this technology, drivers will be able to communicate through cellular phones and still have total control of the steering wheel. In addition, drivers will be able to keep to their prospective destination while getting help from around the highways, inner cities, and around the world without any lost of time. If the chance were given for improved technologies, drivers would not have to come out of their cars to ask for helps like directions to Holland tunnel or 1600 Pennsylvania Ave. Which means these advances in technologies will eliminate the obstruction of traffics in inner cities or highways, thereby reducing the number of accidents and fatalities that could have possibly occur due to traffic congestion and other traffic diseases. All a driver would have to do is just dial the tag number of the closest car and ask for the required help. With this, the drivers will really reduce the rate at which accidents are occurring in the country due to the use of some of these unfurnished devices, by utilizing the megatel, a more equipped and sophisticated device for easy commuting. To conclude, cellular phones are good when used by pedestrians or a non-driver in a moving vehicle or automobile. It is also good for emergency rescue environment, like when a car breaks down and the driver has to call for assistance. However, all these can be incorporated into one safe device for driving. Though there are better technologies that could be further developed, to include and improve the use of car phones, or cellular phones while driving, the main focus should be on reducing cost per call and the number of accidents on the road. It is for this many reasons the MEGATEL system has been implemented so those drivers could make their calls without any steering wheel control effect against them. With the advanced "MEGATEL" hands down inter-air system, one will not have to pick the phone. The logic mode permits you to just push the accept-button and release, you can then talk to the sender. Just push the send button after dialing the number and you can talk to the receiver. Just dial the tag number of the closest vehicle by you, and you can be helped. Just dial the tag numbers plus a family code to reach to your love one on the highway for family emergencies or for immediate responses. Families will be able to dial directly from their home phones and reach other family member via megatel device, to check and ensure that they are safe out there. The directional software for city streets can be installed in networks or 411 network services where if some one gets lost in a city and push on the 411 button, it will open communication with the information network on that city, that will assist the driver with the directions. The embedded MEGATEL random-access memory (RAM) and the CMOS works electronically with the stereo microprocessor intelligence to intelligently power solve the cellular phone problems. The MEGATEL system has a self test chip device embedded inside the stereo to cellular phone control board to always check for the functionality of the stereo, the cell phone, and the bypass to further insure the routine checking of all other communication devices. The transmitters are designed to transmit to all destinations with the assistance of the select mode button to select different options. Any incoming signal will disable all the active functions of the stereo system temporally to allow the receiver to receive incoming cell phone code and other non-stereo signals, until all the signals are transmitted the stereo will stay disabled. At the end of the cellular phone transmission, the stereo will return to the preset mode automatically for the continuous entertainment mode. In addition to what improved technologies can bring to the people, the community, and our society, information technologies control larger industrial and commercial companies and are still lacking futures that can surpass the two-way radios. Two way radios are used by companies for communicating to fellow employees, to know how their businesses are running and to assign special duties to other employees out there, without having to come back to the base. With these technologies, for the most part, messages can only be sent or received. No two people can talk at the same time with the two-way radio device except telephone. However, some companies are forced to have another side phones beside the two-way radios. In addition to the two-way radios, the drivers in any vehicle still have to pick up the microphone to talk. This of cause will have some degree of interference with the steering wheel control. Therefore, two-way radios need to be advanced to eliminate the negatives and advance the safety factors and concentrations on the highway and within our roads. Besides, two-way radios can only go past a certain zone. Sometimes, where there are high rise buildings, the two-way radios will not transmit signals. This type of communication system has been around for long, with the same unimproved technologies. Still, companies are spending money day in and day out trying to get their businesses going without much help on the safety aspect of the technological advances. Therefore, with the improved technologies, companies will facilitate their means of reaching their customer service, and give their customers a better service with very limited time, while satisfying the company's goals.

Improvement comes with the acceptance of new ideas. So, it is therefore important that newer technologies be developed in place of the old to simplify the driving and communication process and also make the world a better place to be. With this new technology in MEGATEL, when a person buys a car and goes to get a tag, the MVA or DMV will give the person a tag and a MEGATEL tag card. The person will then use this tag card with the incorporated state of the art MEGATEL COMMUNICATION and stereo system transmitter and receiver to log onto all MVA-DMV in the country. The megatel communication system can also be installed directly from the factory as an accessory in the vehicle. The stereo devices on older cars could easily be replaced with the megatel communication to meet the current technologies and also to further prevent accidents and fatalities. The other alternative is that, when a vehicle is equipped with this technology, the vehicle owner will log-on the tag number of the vehicle in the MEGATEL SYSTEM and the microprocessor will register the tag number as the acceptance number. When that tag number is dialed from home or from another vehicle equipped with the said MEGATEL device, the microprocessor will power the device to pick the radio or microwave signal and communication can be ascertained. Also, companies would be able to reach any of their drivers or employees at any time, to past on further assigned duties that need to be carried without obstructing the drivers focus. The megatel communication system is unique for cars, trucks, heavy trucks, and planes to improve communication barriers between vehicles.

The log-on process is to enable other drivers to dial the tag number of the other cars and access a phone line or cellular line conversation and be able to ask for help without obstructing traffic. That is, when the driver gets lost in the city or in the highway, he will be able to ask for help without obstructing traffic, by dialing the tag number of the nearest car by the said car. When one dials the tag number of a car, the MEGATEL system will recognize where the call is coming from and the caller will accumulate the bills. Also, if a household has any number of cars and wants to know the where about of any of the other family cars, the family member would just need to use the family code and the tag number of any of the other cars to signal for emergency response. That is, one would simply dial the tag number and access family member's cars. The driver of the said car, upon pushing and releasing the accept button, will then accept the call and would be able to communicate to the family member. Also, a special code can be programmed to hit all the receivers of the number of family cars at one transmission. This will initiate a family line conversation on all the other cars and open the lines so all members could be heard, to ensure the safety of the family members. With this technology, the careless parking in big city streets or the obstructions of traffic by other drivers in these cities will be eliminated, thereby assuring safety and reducing accidents and fatalities. In all, MEGATEL COMMUNICATION SYSTEM is a stereo cellular phone device that introduces the idea of using tag numbers as car or cellular phone numbers for the information supper highway. The cellular phone is like the regular cellular phone with an information link that allows the stereo to recharge the cellular phone and also permit communications via the cellular phone to the stereo device and allow said communications to be broadcast through the car speakers. The cellular phone when hooked to the stereo slot is a phone system with two metal bases at its ends that allows the transformation from hand held phone to hands free phone device that permits save driving and communicating while driving. When pulled out of the slot is a hand held cellular phone for normal pedestrian's information and communication usage. When linked, the device assures total 100% safe driving in the cities or highways while communicating to friends, family members, bosses, and the love once.

Secondly, with this device, if a Corp is chasing a car on high speed chase and in any of the street roads or highway, the Corp will be able to alert all other cars towards the direction of the chase to stay off the said lane through a common one push-button. This will help reduce traffic panicking and some of the highway chase type accidents that had occurred around the country and will also save many lives. By implementing this more thorough thoughts in advancing the information technology for the super highway, the cost to the society will be reduced by over 200 billion. In addition to this state of the art technology, every call made with the MEGATEL device will be local. That is, if one drives from one state to the other and wants to reach to some one in the new state, even though the megatel system is from a different state, it will hit local receivers and transmitters and be charge for local. The MEGATEL device usage will also give cell phone users large breaks. Cell phones are very limited in its use. A cell phone beyond its local network becomes a very expensive device, but with the MEGATEL, each call made in a city found with the megatel device, to any person in that city will be local. This does not eliminate the long distance links when dialing another location. For example, say a driver leaves Maryland to New Jersey. Every call that the driver makes to a family member in Delaware while in Delaware will be local. When the driver gets to Delaware, the MEGATEL device will switch to Delaware station through radio waves and microwaves transmissions. If the driver gets to New Jersey, the MEGATEL device will pick New Jersey frequencies and any call made there will then be local. However, if the driver decides to call the original home from New Jersey, then there would be some variances. With this MEGATEL device, phone companies will eliminate some of the car phone numbers or cellular phone numbers being used currently, by implementing the tag number plus ID-code dialing. The beauty of this MEGATEL system lies in many different areas of communication system. For instance, say a driver is driving down town or in the middle of the night at any highway streets and realize that there is another car chasing the car. If the driver don't have any help at the time, the MEGATEL device allows the driver to push a 911 button and transmit the danger signal to the nearest police station closer to the driver's direction or location. This will open a conversation between the said driver and the police station without interfering with the driver's steering wheel control. Also, the car chasing the driver will be less informed of the driver's conversation with the police. The driver will then be able to give the police a complete description of the car chasing the said car without much body language. If the driver knows the tag number of the car chasing the said car, then a 911 button plus the tag number will give the Corps a clear description of the person or car chasing the said car. With this advance technology in place, the crime rate will drop and the society cost of repairing the aftermath will drop by 200 billion.

Also, school principals, teachers, and parents will be able to use the school bus number, school bus tag number, or school bus number and tag number to check on any of their student. They will also be able to use this MEGATEL device to verify if all the kids in the buses reached home safely without interfering with the driver's steering wheel control. The MEGATEL device is a device that will help reduce communication problems and crimes around our cities. Calls will be transmitted from stations to stations, cars to cars, and megatel to megatel through the facilities of companies whose chief business operations are through telephone or Internet. Any subscriber will be able to reach any other subscriber from any other company and the subscriber's provider will mail all the bills. For instance, when a driver uses this MEGATEL device to dial, for each dialing location, if the number is a local number for that location, and the driver is within that location, the MEGATEL device will pick the nearest phone company station. The microprocessors and the fiber optics used to computerize the communication processes allow more futures to beautify the MEGATEL system advancement. The computerized station detector will search for the nearest station and have the station to transmit all the coding signals to the various destinations. The station will then dial the number as a local number, provided that the caller and the receiver are within the local zone. If the receiver is out of the local zone were the caller is calling from, then the call could become a distance call and would be treated differently. With the tag calling system, the MEGATEL device will be able to search among huge array of existing MVA-DMA stations, picking the dialing tag numbers for any car and dial the car directly. If the car is tempered with, the computerized MEGATEL device will explain this to the caller and the caller will immediately know that there is trouble somewhere. The computerized station detector will prepare all itemized bills through the megatel Internet services with telephone companies and send to the subscribers of each MEGATEL user. The tag card will carry programmed information on how the MEGATEL device and the computerized phone station detectors should work. The tag card, the MEGATEL device, and the computerized station detector are elaborating systems that are made up of various kinds of transmission media sensors that allow interactions between the devices.

These systems would pick the stations and assign the stations to carry voice and data signals from place to place, and switching the systems that connect the circuits that link together two parties. Only high technology combined with the economics of scale in research, design, manufacture, and operation can keep the cost of telephone down as services expand. So the MEGATEL system is design to aid this technological branch to reduce cost and increase safety. The microprocessor is designed and programmed to identify numbers and to speak to other microprocessors. These microprocessors serve as the main information exchange center by absorbing and emitting radiant energies through waves and can demodulate the absorbed energy or modulate the emitted energy. The energy signals are modulated or demodulated from the coded information. The MEGATEL microprocessors allow other network and businesses to advertise by programming plurality of microprocessors, said processors being interactive, to emit the advertisement codes. Another important feature of the megatel device is that, the tag code can be changed if the tag number is changed. The megatel provides means for feeding external data into said radiant energy data channel. It also provide means for modulating the radiant energy emitted by said radiant energy sources, according to the output codes assigned to each of the microprocessor. These codes could be demodulated to demodulate the absorbed radiant energy. That is, the microprocessor absorbs the radiant energy signals when calls are transmitted and also exchange coded information or signals. Enabling the powered antenna motor to serve as a wave guide power supply that receives and transmits signals from the microprocessors. This antenna will absorb and also emit signals from other microprocessors. The microprocessors are programmed to accept tag numbers, phone numbers, industrial equipment numbers, commercial vehicle numbers, to communicate with ambulance, fire trucks, corps, emergency vehicles, construction areas and equipment. When any communication is open, plurality of other communications can be ascertained. This includes construction companies, road blocks, accident information, police chase, restaurant and commercial advertisements and any other traffic related information could be programmed to reach to any or every vehicle on that direction via microprocessors. Permitting megatel communication for every one in the supper highway and inner city to reduce traffic related accidents caused by car phones or hand held phones.

This MEGATEL system is a stereo system with a built-in cell site for cellular or wireless phone transmission. The device uses the fiber optics to transmit and receive wave signals from radio waves and microwaves, and also to determine the amount of light traveling down the fiber. The device also uses fiber optics to measure the amount of light coupling from one fiber to another in optical radiation. The fiber optic receivers for this device are high performance and easy to use linear fiber optic module that are designed to extend the range of radioactive frequency (RF) signals in hard to reach areas such as tall buildings, underground railroads, submarines, and tunnels. Also, a fiber optic modem chip that operates at full or half duplex over fiber optic cables or waves may be used with the MEGATEL SYSTEM to allow faster communication with other machines. The MEGATEL SYSTEM has many design options that will better advance safety and also simplify its usage. One of the many options is the design of the MEGATEL SYSTEM with a hold in slot for the cellular phone. The cellular phone have a coded metal base end that, when inserted into the hold in slot; will recharge the phone and also permits cellular communication through the stereo MEGATEL MICROPHONE and the stereo speakers. When the vehicle is packed, the cellular phone is then pulled out of the slot and is used like a regular cellular phone or wireless communication for non-driving usage. Thereby enabling safe driving while communicating with both hands on steering wheel. That is, the MEGATEL device is used for hands off communication by a driver and also like a regular cellular phone if taken out of the slot. The microphone is used to talk back without actually holding on it. This will allow the driver to totally control the steering wheel with both hands while talking to the caller. The microphone could be mounted on the ceiling for a headset, embedded in the sunshade, the steering wheel, or the dashboard. The headset or speakers is powered by the MEGATEL build-in amplifier and is connected through modular connectors. The main stereo volume control also controls the phone volume. This MEGATEL device also takes messages for later transmission and is Internet ready. The screen for the Internet services that enables readability is built in the sunviser with and in-built speakers for the audio system. The screen is covered with electronic control protective shield that is opened when the Internet service is enabled. The Internet service is disabled when the vehicle's speed exceeds the preset limit. Thereby allowing the Internet service to depend on the speed of the vehicle, to further prevent future accident caused by driver's lack of focus. The megatel runs off different frequencies as well as giga range frequencies for better clarity. That is, signals are separated into more frequencies to make conversation interference very impossible. The headset is attached to the cellular phone to be powered by the amplifier and directly receiving all incoming calls. It could also be inserted into the slot in the MEGATEL so that the megatel will receive all transmissions and also receive codes through the metal base of the phone, to power all signals through the microphone and the antenna. The digital signaling microprocessors is design to continually monitor all communication devices and automatically transmit and receive different coding signals to and from different destinations. The megatel is a stereo-phone with Internet ready access mode, powered by the stereo amplifier and screen viewed from the sunviser that has a protective cover shield to further prolong the live of the screen. Other communication devices with microprocessor chips that transmit and receive different signals through radio waves and microwaves frequencies are made interactive with the megatel communication device. The device serves as a stereo and telecommunication station with digital signal processing of millions of instructions per second. With the communication-processing module, the megatel microprocessor information handling means allows other devices to communicate to the megatel and allows broadcasting through the stereo speakers and microphones. The microphone could also be of many designs including a cordless headset mounted in the vehicle, at the roof so that it could easily be removed and be used by the driver for privacy usage incase there is a third party in the vehicle. The cordless microphone is designed to improve on noise cancellation and to transmit signals with better clarity. Handling a cellular phone with one hand and driving at the same time can create hard flexion on the shoulder, headache, and neck pain, which can intend influence an accident. Where as driving and talking through the headset is very relaxing and will help reduce the many accidents that had occurred. Together with the megatel, there will be no careless influential accidents caused by the communication devices currently in use. Just a second of poor posture while driving can lead to a serious accident. Therefore, it is the object of this invention to introduce the MEGATEL device, a hand off telecommunication device designed to ease traffic communication and also reduce the number of accidents caused by the previous cellular phone usage by drivers while the vehicle is in motion. The stereo for the MEGATEL has a built in amplifier that also amplifies the microphone or cordless microphone. The cordless microphone is adjustable to accommodate different drivers. The mode button has many features including deactivating incoming calls if the driver do not want to be bordered. When the mode is switched from phone to stereo, one will be able to listen to music through the headset, and when there is an incoming call the mode will automatically switch back to phone. The MEGATEL interface unit contains a circuit board that allows the systems control functions and the memories to include the control functions of the microprocessor and the network software. When the fiber optic modem chip is installed, it will be activated by a manual or automatic switch, or by allowing the corresponding pin interface to activate the fiber optic modem. This will easily be achieved through the transmitting time of the following sources; an internal oscillation, an external clock from the MEGATEL device, a loop-back clock derived from the receive signal. Also, the transmission of the modem is synchronous. That is, the transmission time is selected for internal, external, or loop-back clock. This will then be converted internally to synchronize the format in compliance with other standards. All other formats are switch selected. This modem chip could be a card or any other design, to better suit the purpose of transmitting and receiving signals to and from automobiles and other transportation equipment or industries. With this device or with the incorporation of a pressure sensor on the seat surfaces of airplane seats, electronically knowing how many passengers are seated and also communicating to individual passengers in the plane will be much easier. The linear fiber optic transmission links is so unique in the MEGATEL design in that, it is used for satellite earth stations to carry signals at the same frequencies as the links. With this linear fiber optics, distance limitations between antennas and the MEGATEL device or other broadcasting studios and operation centers will virtually be eliminated. The linear fiber optic earth satellite station and the delivering signals all will be uncorrupted without any automatic gain control. To meet the global telecommunication demands today, and also improve on the safe usage of phones by drivers, the linear fiber optic transmission system will satisfy the design of all the state of the art telecommunication devices of the MEGATEL system. The system will allow communication between many personal computer systems, space communications, communication between movie producers and actors, without physically holding the phone system to talk. One will have to just push a button and release to talk while driving or performing other duties in the work area. Communication between actors and producers will be easily transmitted, received and controlled by a single device with a built in phone system. One will have to just push the receive button to receive incoming calls and talk while driving. All signals are digital and analogs via radio and microwave frequency signals through the fiber optic cables.

Often, automobile drivers like to communicate or talk on the phone while driving. The unsafe technicality of this behavior is that, some drivers hold the phone on one hand while controlling the steering wheel with the other. Sometimes, some drivers get carried away by the conversation and lost control of the vehicle direction. Other times, drivers block traffic because they are trying to make phone calls or ask for directions. As the Y2K approaches, attempts need to be made to advance and abolish these behaviors and make the $21^{st}$ century a better and technological world to live in. Therefore, communications by drivers and other automotive communication devices have to be advanced so that, drivers will be able to communicate without interfering with the steering wheel control. Also, when people get lost while driving around, they would not have to come out of their cars to ask for help. In addition, a Corp will be able to communicate to any driver while both cars are in motion with this MEGATEL system. The key to the MEGATEL device or the $21^{st}$ century communication technology is to improve our daily live with modern technologies. The process of exchanging information from vehicles to vehicles, or from homes, offices, businesses to vehicles is called communication and human senses depend on more advanced technologies to make this simpler. Information is the knowledge that is conveyed between the parties involved. For this information to reach the other party, it has to be transmitted or pass along so that the party can receive it. Sights are another way of communicating. That is, what one sees gives great meaning to what he sees and hears. The exchange of messages and the accidents that have resulted in between, as one party tries to convey a message to the other party, is what is leading to the advancement of this MEGATEL system. During the communication process or drills, the parties usually get carried away and lost control of the steering wheel. In many cases, these have resulted in accidents in which the causes of the accidents were not found. Because the accidents were communicated to a third party through sights, calls for the advancement of a better automotive communication system that will not take the driver's hands away from the steering wheel, but rather improve on the communication means. It is therefore the object of the third party to communicate these findings into technologies that could eliminate these types of accidents and also prevent many injuries and deaths. The key to solving these technical problems includes the technical processes of exchanging information. This information is in the form of communicating, and communication technology is the process of transmitting information from a source to a destination, using codes and storage signals. Machine to machine, machine to human, and human to machine communication are the most common forms of communication that the MEGATEL device is intended to implement, with "hands off steering wheel" design system. The human to machine communication will allow the driver to transmit information to the other vehicle with an extended capability. The machine to human communication system will allow the driver of any of the other vehicle know that some one is trying to reach to the driver or the occupants.

The primary focus of the megatel is to improve automotive communication and to reduce accidental injuries caused by the lack of concentration on the steering wheel. The microchip or microprocessor of this device turns receivers on and off when a call is made. It also receives and transmits signals from one vehicle to the other to allow the communication means. The microprocessor of this device will increase transmittal speed and also turns on the home phones and 911 codes when a collision is detected. This device could be programmed to do all of these functions and more, without interfering with the steering wheel control. This electronic hands off MEGATEL system uses automatic switchboards, radio waves and microwave transmitters, satellite, and optic fibers to send phone signals around traffic and the world. Information is sent from a source to a destination through codes and signals. The transfer of information needs designing, coding, transmitting, receiving, and storing system.

This electronic hand off telecom system is the source and the starting point of a message to be sent. This source might be a machine, a person, or a supplemental system. The designing process for the electronic hand off MEGATEL system includes ideation, purpose, and creation. In ideation, one would get and work on ideas that will increase driver's concentrations, reduce the number of accidents caused by lack of steering wheel concentration, and improve our way of life. The reasons for the electronic hand off telecom system is to implement actions that will increase traffic communication and reduce traffic accidents caused by the previous automotive phone system. Some of the purpose of this message system is to inform, persuade, instruct and entertain drivers and other businesses around the world. The information system would need a receiver to inform and provide the transmitted message. The general message that instructs all drivers will provide directions or knowledge about the future or upcoming events and road situations from the coding instruction in the highway and other areas as the car approach said locations. The message that persuades will help convince drivers and others to take actions on different situations and events around the cities and the highways. Advertised messages could be sent to persuade the public and drivers on upcoming events and sales, without disrupting driving habits and concentration. All advertised board on highways will have programmed microprocessors to work with the MEGATEL device and will pass on the advertisement to on-coming cars from a distance as they approach the board location. Exit boards and road signs would carry plurality of the programmed microprocessors too. These programmed microprocessors will allow communications to be enabled with the MEGATEL device to further let the approaching cars know the next exit on the highway. That is, the MEGATEL device will be able to communicate with all highway signs and advertisement if the chips are compatible with the programmed processors. Besides, the microprocessors would be able to communicate to each other processor through waves and coded signals. The electronic hand off telecom system in MEGATEL will still be able to entertain with the attempt to amuse drivers while driving. Car stereos will operate normally as stereo, phone and Internet device, but when there is a message or a phone call or e-mail, the stereo system will be bypassed and the phone system will automatically be activated. The stereo amplifier, through the said stereo speakers, will amplify the receiving and transmitting messages. For the transmittal message, just talk back and the microphone located on either the steering wheel, sunviser edges, ceiling, or dashboard will absorb and transmit the message so the megatel device could emit it out. The sunviser or sunshade edges is more recommended and the sunviser is used in the megatel as the electronic screen for receiving electronic and Internet messages. The sunviser has automatic or folding cover for the e-commerce screen. This screen allows the output of electronic messaging and Internet communications. Creation is the assembling and recording of ideas. The sound waves produced by the radio can transmit or receive coded signals to any destination. After a message is designed and coded, it has to be transmitted or sent to its destination. The many ways of transmitting information is called media. These radio signals traveling through the atmosphere (air) would carry the coded messages to the media. That is, the waves of electrical energy will carry radio programs, cellular transmissions, and TV broadcast to their assigned locations.

Telephone conversation travels through wires and fiber optic cables. Receiving and transmitting this communication is the process of acquiring and decoding the message. The receiver will decode or interpret its messages from any of the source. The exchanged information is what will then be understood in the conversation. The stereo receivers will convert the radio waves into pleasant sounds that one can hear and understand. Messages could also be stored for later use too. But after the storage, the process of communication will not be complete until a feedback is received. Successful communication is often the result of feedback provided to the sender. This feedback is usually a returned information back to the sender to confirm that the message was received. The feedback is a communication process that responds to the completed communication signal and coded signs. Another point of concern that is affecting current hand held cell phones is the interference. Interference is the distortion of signals intended to the receiver. This interference is caused by the reception of undesired signals. The interference can be the called noise or distractions that interferes with the communication process. By focusing to reduce the interference, the design process of megatel would invite an accurate communication device through the stereo amplified means of megatel and its rechargeable means. Accurate communication is the freedom from mistakes or errors when a message is sent to a receiver. However, manufacturers realizing this interference, would make the accuracy possible when putting the pieces of the MEGATEL together. The receiver would be able to instantaneously pick the signals without any interference. When sending a message to some one, the person should not receive any other message other than what was communicated. Careful and design planning may prevent inaccurate transmissions of information. Therefore, different manufacturers would design the device with a great consideration for accuracy and destination free. The key to this advanced communication device is to allow friendly and save conversation around the high way and inner city by increasing the amount of communication. The communicated information will be exchanged among other people, machines, Corps, governments, businesses, schools, and industrial groups without interfering with the environmental safety. In part, telecommunication is the transmitting of information or signals between distant points where the information would be received, understood, and used. All major industries would include varieties of systems for the exchanging of messages. The most common example is the telephone. The use of satellite to transmit radio signals around the globe is an excellent example of telecommunication system that will be utilized in solving the current problem. Without this telecommunication satellite, one would not be able to receive many radio transmissions and programs.

In this megatel device, information is transmitted in the form of messages, electronic signaling and transmission. Where as, this same information can be passed on to many others at a time, in the highway or other locations. For example, A Corp chasing a car in the highway would be able to transmit certain verbal information x-miles away, through the use of the coding means, to reach all vehicles on the chasing lane. The chasing lane and the direction of chase would be passed on instantaneously to all the vehicles heading to the said direction to future eliminate any potential accidents. This will also keep the traffic informed in advance, and will further reduce the amount of accidents or delays that could have occurred without the use of this advance information technology. In all, the advanced information technology system will include human to human, human to machine, machine to human, and machine to machine communication. This communication system is design to make possible, the quick exchange of information over long and short distances at low cost. The information will be coded, transmitted, and received in electronic form. Major construction companies will be able to pass the following messages to approaching traffic miles away: "Road construction ahead, Road block, Traffic jam, Major accidents, Advertisement." A constant flow of more messages could be followed. Our life relies heavily on communication system. From the beginning to the end of the day, we use communication devices to reach to others, or relay our thoughts to others. The advancement of the megatel communication system further include communication with large groups of people or individuals, as well as advertisement, traffic instructions, entertainment, persuasion and information. When calls are made, the calls will be sent through series of transistorized switches until the calls are connected with the other telephones at the addressed locations. This advanced information technology system enhance the convenience of communicating quickly and easily, over any distance, without interfering with the steering wheel control. The communication process of the megatel device consists of designing, coding, transmitting, receiving, and storing of information or messages. Said device is interactive and allows easier communications and safe driving. Its internal modem allows wireless communication that includes networking and the Internet. The designing process is quite uncompelled and unlimited. It includes thoughts, focusing, and creation of advanced devices like the SAIT system, to further improve on the telecommunication world. Devices that could have helped our way of life and improve on the automotive communication processes and the safeties involve, without interfering with our driving abilities were lacking. It is for these reasons that the megatel device, a smart supplemental advanced information technology system, is being put in place. The acts of selecting what is good for our environment and the society's safety, and revising these acts to invasion the past problems is the goal to advancing a better technology for the advancement of the life of the people around the world. To better achieve a safer and efficient system, coding of the technology to accommodate and solve the existing unsafe driving habits is the initial process to including all the previous, in-addressed problems that existed with the automotive communication processes and the wireless environment. Using electrical, sound, light or some mechanical can do the coding, electronically, or electromechanical means to separate signals. When the message is received, it is decoded so that the receiver may better understand it. After the message is decoded and understood, it may then be necessary to store the information in any other machine, either at home, office, car, or fax for use at a later time. When a message is sent, a feedback is return to inform the sender about the status of the message. The automotive communication system in megatel involve more purpose like; informing, instructing, persuading, entertaining, and advertising. The negative aspect of the communication system in the form of interference is addressed upon manufacturing the MEGATEL device. This device introduces the true meaning of information technology for the $21^{st}$ century. Often, we rely on our senses to communicate with others. Because of some neglecting factors in the past system, we have to rely on both our senses and technologies to communicate with others. The technology is attached to our senses to extend the capabilities of human senses to understand others without obstructing traffic or further force an unsafe environment for others.

The same antenna designed to control the stereo are all built in one to work with the internal logic board, and also to provide excellent reduction of the pressure effects of the stereo and the phone system for megatel. Together, the stereo and the phone are called MEGATEL SYSTEM. The reduction of the pressure effect will improve the transmission and receiving of the transmitted information. This antenna is made of cell foams and would allow the stereo and the cell phone to operate on the same mast mounted antenna. The antenna will receive and transmit coded information; all functions and signals would then be emitted and absorbed on the same antenna. The single but dual functional antenna will solve the acoustic interference problems that exist in the wave traffic. The quality features of the antenna include stainless steel ferrule, high-gloss urethane finish over fiberglass, powerful brass internal elements, ferrite choke bead, UV stable RG-8x marine cable with a factory-installed mini-connector. The antenna is powered by a motor, and designed to reduce the whistling effects and also to damp the occurring wave vibration. The antenna motor is turned on when the ignition switch is on. When the ignition switch is turned on, the circuit for the antenna motor will be closed and the antenna motor will rotate on one direction and the antenna will be raised up. When the ignition switch is turned off, the circuit for the antenna motor will be opened and the antenna motor will rotate on the opposite direction for the antenna to be lowered. The antenna end cable is feed down into the motor housing opening and positioned correctly inside, with the MEGATEL turned off so that the power antenna motor would start pulling the rest of the power antenna cable till the collapsed mast sections down into the motor housing. The cable and the mast are carefully guided into the motor housing. The MEGATEL antenna is designed to transmit a shaped wave for the stereo and the built-in cell phone. It has a collapsing spring at the base of motor, with a straight extended vertical exposure. The antenna is inclined slightly to have much higher transmitting signal, since the cell site path is located in the horizontal path way from the location. However, the optimization of the antenna allows for both vertical and horizontal transmission. The slight inclination of the antenna will increase the amount of power transmitted straight up into the sky. This will also reduce the static because cellular phone base transmitters are more powerful than the verticals, and signal reduction due to bent cellular antennas are more noticeable on the other end. However, the MEGATEL will have a stronger link from the vehicle to oversee any weak signal, by making the MEGATEL antenna 95% vertical. The antenna could be from 4" to 24" with ultimate signal pulling power. All internal elements are sealed with fiberglass rod coated with high-gloss urethane finish. The high-gloss urethane coating is to ensure lasting performance and more compatibility with the other high quality antenna products that could be used. The universal design of this MEGATEL antenna allows it to operate with other frequencies. The design of the MEGATEL antenna calls for the improvement of acoustical reduction performance result, and also perform the task of transmitting, receiving, switching and transmitting, receiving and switching, receiving combining ground to air to transmit and receive signals.

SUMMERY OF THE INVENTION

The present invention is intended to provide improved hands free cell phone and Internet usage while driving with signals from different frequencies. The invention also introduces a method of assigning new cell phone numbers which include tag number assignment with selected personal identification number.

The frequencies of the megatel have maximum allowable power levels, which are comparable to the task to which the radio is designed to carry. These frequencies will be available and set aside the same radio and microwave frequencies, for the coded electromagnetic waves. The coded waves will be used to guide the direction of all addressed information or coding. When a transmission from any frequency is sent out, the waves will hit a layer of the earth's atmosphere called ionosphere. The ionosphere will then reflects the waves back down to the earth. These waves may reflect back and forth any number of times till the receiver is found. For better understanding of the wave's behavior, it should be compared to a ball that bounces in a room with a low ceiling. The ball will bounce off the floor and ceiling several times before it stops bouncing. The ball will most likely strike an object that is placed in the middle of the room. That is, a wave that is bounced off the ionosphere is very similar to the ball's behavior. Sooner or later, the signal will contact the receiver. The wave reflections off the ionosphere will make transmissions over great distances possible for wireless communications including the Internet and networking. The MEGATEL transmit and receives signals through radio waves and microwaves. But microwaves have several advantages because their wavelength is so small. Some of the advantages of the microwaves are that signals can be projected into a very small area. Which means the energy is used efficiently. This will allow the antennas to be very small in microwave use. Some of the disadvantage of the microwave signal is the effect of poor weather on microwaves. That is, since the wavelengths are so small, rain, snow, hail, or even a high wind may absorb the energy in the signals. However, spring-like behavior on the powered antenna compensates for the wind and other foreign factors. The MEGATEL, like the cellular phone, uses radio waves to transmit information. In addition, the present device uses both one way and two way radio messages to transmit information. That is, messages could be sent back and forth through the radio waves between a source and a destination. When using the megatel with the two-way radios, it is possible to have feedback. That is, one can respond directly to messages on two-way devices. Two signals could be sent at a time with the MEGATEL device. That is, voices would be heard from both the sender and the receiver at the same time. In the other two-way radios, when a talk button is pushed in, the radio cannot receive a message, but could only send messages out. The major portion of the switching of the megatel device is electromechanical. An electronic pulse (number dialing) will cause the switching to occur and allow communication, including the network and the Internet. But the preferred switching is the electronic switching system (ESS). That is, the megatel system and its computer programs are used to do routine wireless operations and switching with the help of lots of transistorized switches and microprocessors. All the switching programs are stored in the microprocessor and the processor is able to differentiate a telephone signal from a stereo or radio signal and bypass the radio, so that the receiver could receive and transmit messages. When sending messages, after the numbers are dialed, the computer will review the number codes and check for wireless phone or Internet assignment. Then the quickest switching route will be mapped out through the use of the transistorized switches and the microprocessors to complete the call. Also, when a friend dials the tag number of the car, or the cellular number, the transistorized switches and the microprocessors will collect the coded electronic pulses from the dialed phone. The computer will then review all the numbers and maps out the switching route to complete the call. This electronic wireless switching system will make communications more efficient than electromechanical switching system. It is also quicker, less costly, smaller, more reliable and uses less power. The MEGATEL system will also eliminate some many phone numbers that have been assigned to many cellular phones in the nation. Cellular phone numbers could be changed with the tag number plus a programmed code. Where as, the direct tag number dialing is to assist other drivers.

The program will allow the computer to identify codes, complete all calls, and also controls the overall function of the MEGATEL system. A network, which is a system of interconnected subsystems, works together with the MEGATEL to make sure that all the coded number switching goes to this network. The car phones in (MEGATEL) network; homes, offices, businesses, and industrial connections will allow worldwide connections and also provide a common link to the computers and the Internet. The megatel computers which permits networking, are made of transmission links, terminals (telephone) switching operation, and more features that work together for the Internet services. It also necessitates calls completion and also sends worldwide information via car installation through the Internet. The transmission links transmit calls, the network switching system complete the circuits, and the MEGATEL (telephone) system allows the sender and the receiver to hear and be heard. The MEGATEL device have a modem that enables Internet services and other searches. The modem allows the megatel device and its computer system to communicate with other devices and their computer systems, over the microwave to radio wave links through wireless communications, to allow better wireless Internet services. That is, any car radio with the equipped MEGATEL device and modem could communicate to each other through microwave lines, radio wave lines, and phone lines to the communication satellite. The communication satellite will receive and send signals to all coded destinations. These signals must travel a great distance to the satellite (up link) and back to the earth (down link) again to enable transmission. The microwave beams will transmit signals and be used for transmissions of signals from source to destination. Microwaves are able to cut through the earth's atmosphere easily. Therefore, the beams must be carefully aimed towards the proper ground station or satellite. The signals are sent and received using special antennas. However, the ground antenna and the satellite must be able to stay in constant contact with each other in order to transmit these signals. The satellite must also circle the earth at the same speed the earth revolves on its axis. If the satellite moves faster than the earth revolves, the contact could be broken. The phone conversations will travel through microwave relay stations. Vast amount of information can be transmitted through microwaves links. This is because microwaves are extremely short. Therefore, microwaves can be concentrated (focused) into a very small, narrow beam. These beams will allow powerful, efficient transmissions around the globe. That is, a very large and powerful transmission would send thousands of telephone calls every second. All codes for this system are in binaries. These binaries are series of 0s and 1s that represent phone numbers and the tag numbers, letters, sound, or visual images. These binary numbers are in data form. Data communication is the process that allows computers to talk with each other. The codes, which are the vehicle for transmitting messages, are the language that the computers will use to communicate with one another. The coding will also ease communications between machines made by different manufacturers. This code is in a programmed form and could be executed by the microprocessor. The American Standard Code (ASC11) may be used for information exchange. This code includes all the letters of the English alphabet, the number 0 through 9, and punctuation. The design schedule for this state of the art MEGATEL system allows family members, companies, friends, businesses, relatives, and industries and others around the globe to stay in close contact with their love ones, job and more, at any time, anywhere, and any state while driving. The transmission could be parallel transmissions for short distances or serial transmissions for long distances.

In one embodiment of the invention, a hands free communication is achieved. In another embodiment, a wireless Internet activities are achieved. An IC card is used to store data specific to the communication means. The advantage of the invention will become apparent to the understanding of safe driving.

DETAILED DESCRIPTION OF THE PREFERED EMBODIMENT

Figure 1:
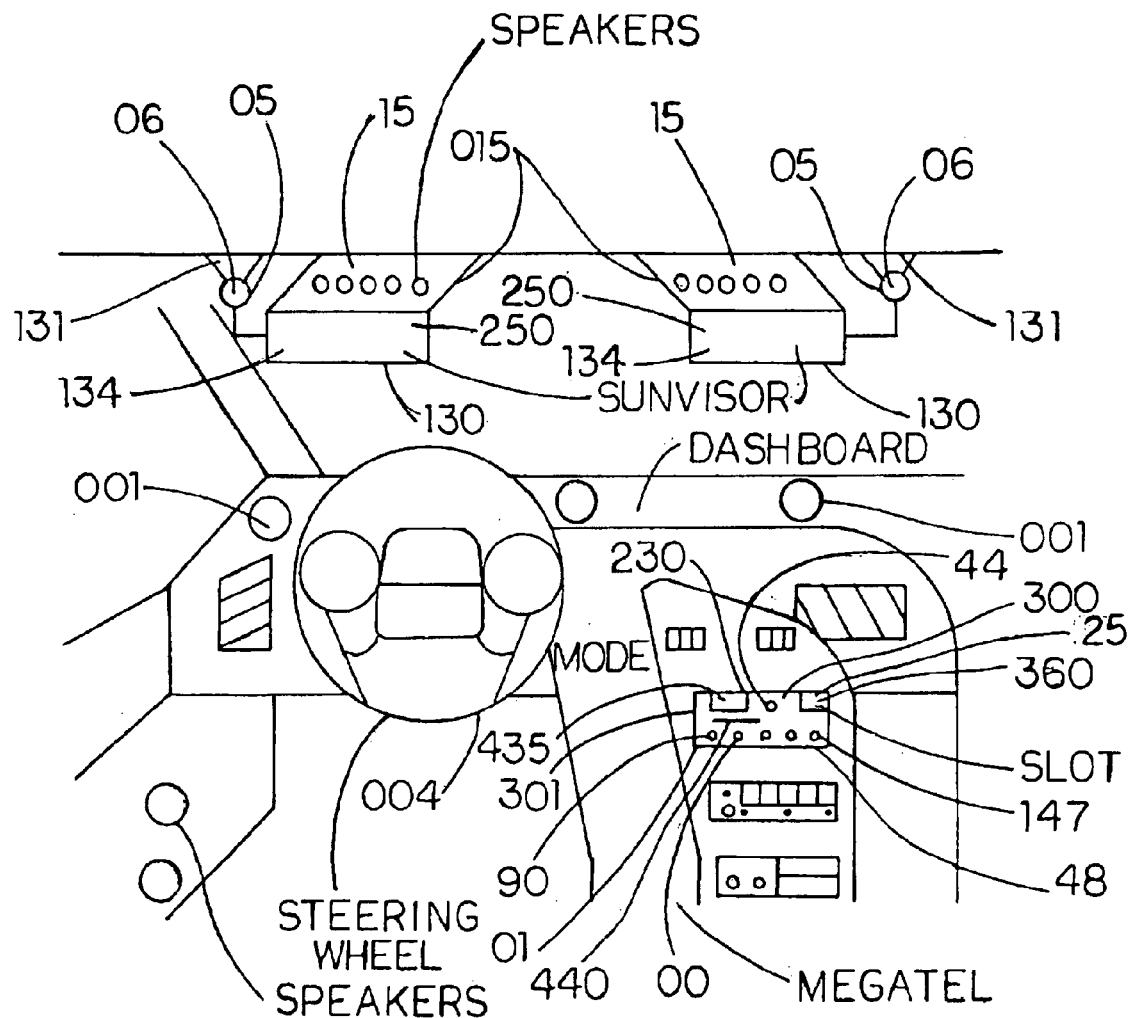
FIG. 1. is a diagram showing the megatel, the monitoring screen, the speakers and the steering wheel, all are mounted in locations common to normal vehicle accessories.
Figure 2:
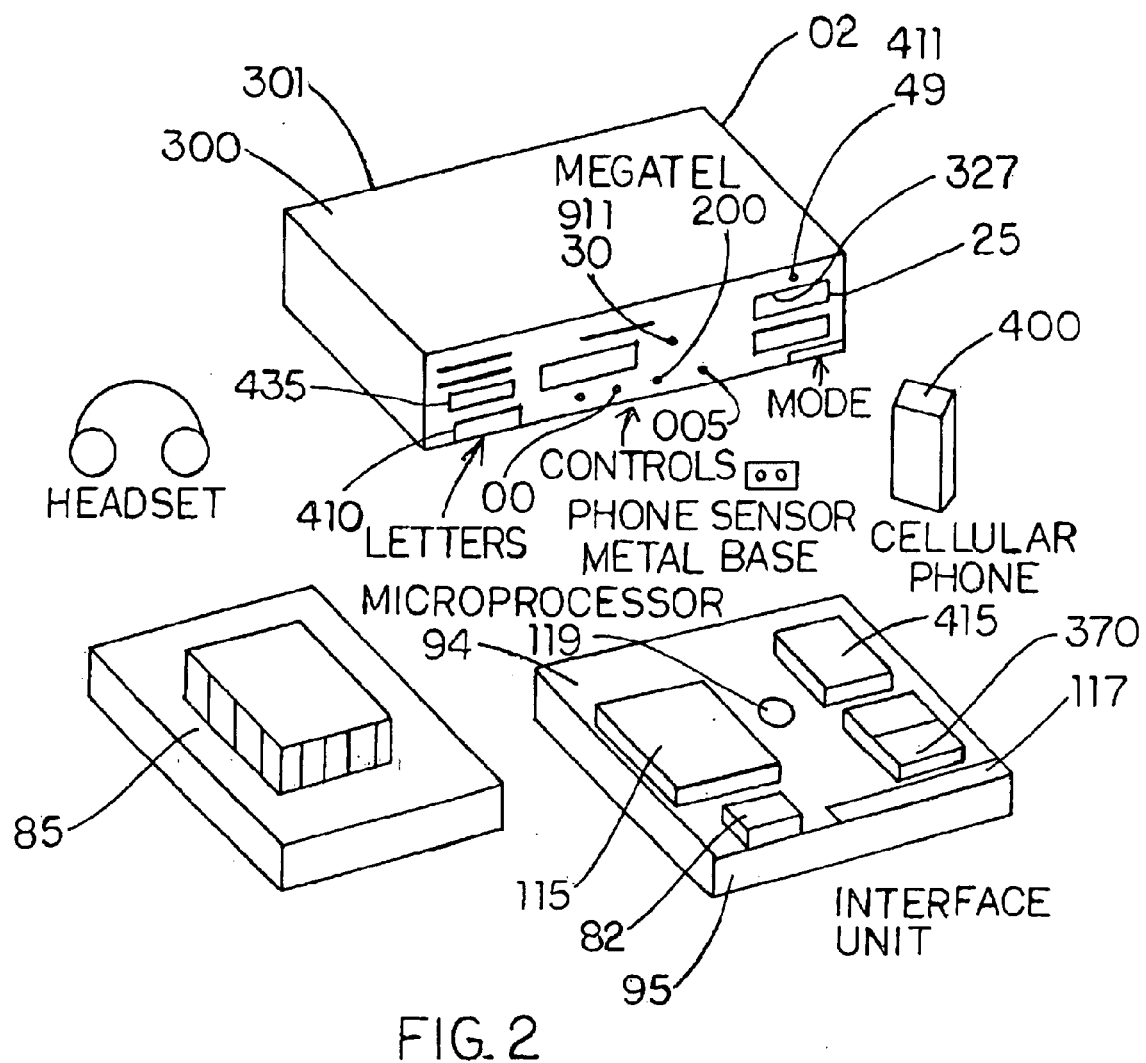
FIG. 2. is a diagram of the interface unit, the microprocessor, a second megatel, a cell phone and the metal base sensor.
Figure 3:
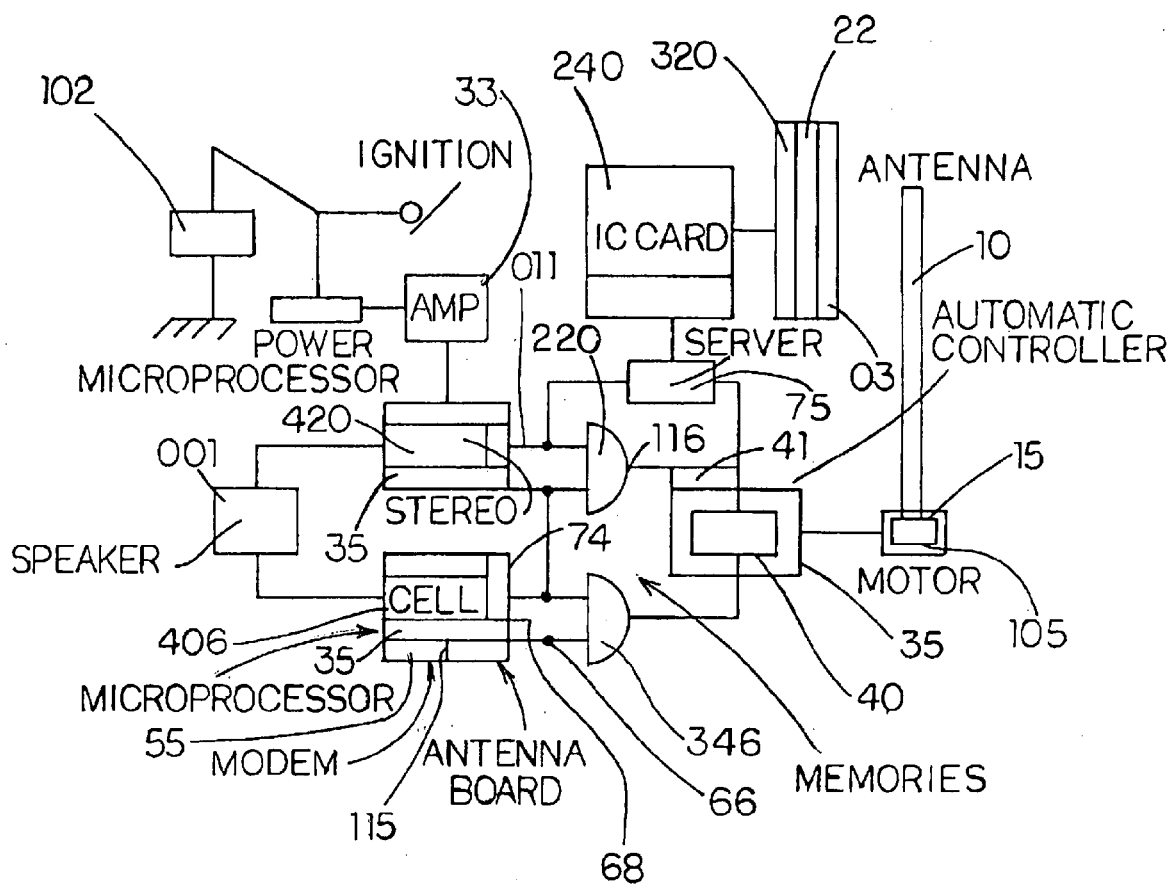
FIG. 3. is a circuit diagram showing the sequence of events which occur during the operation of the present invention.
Figure 4:
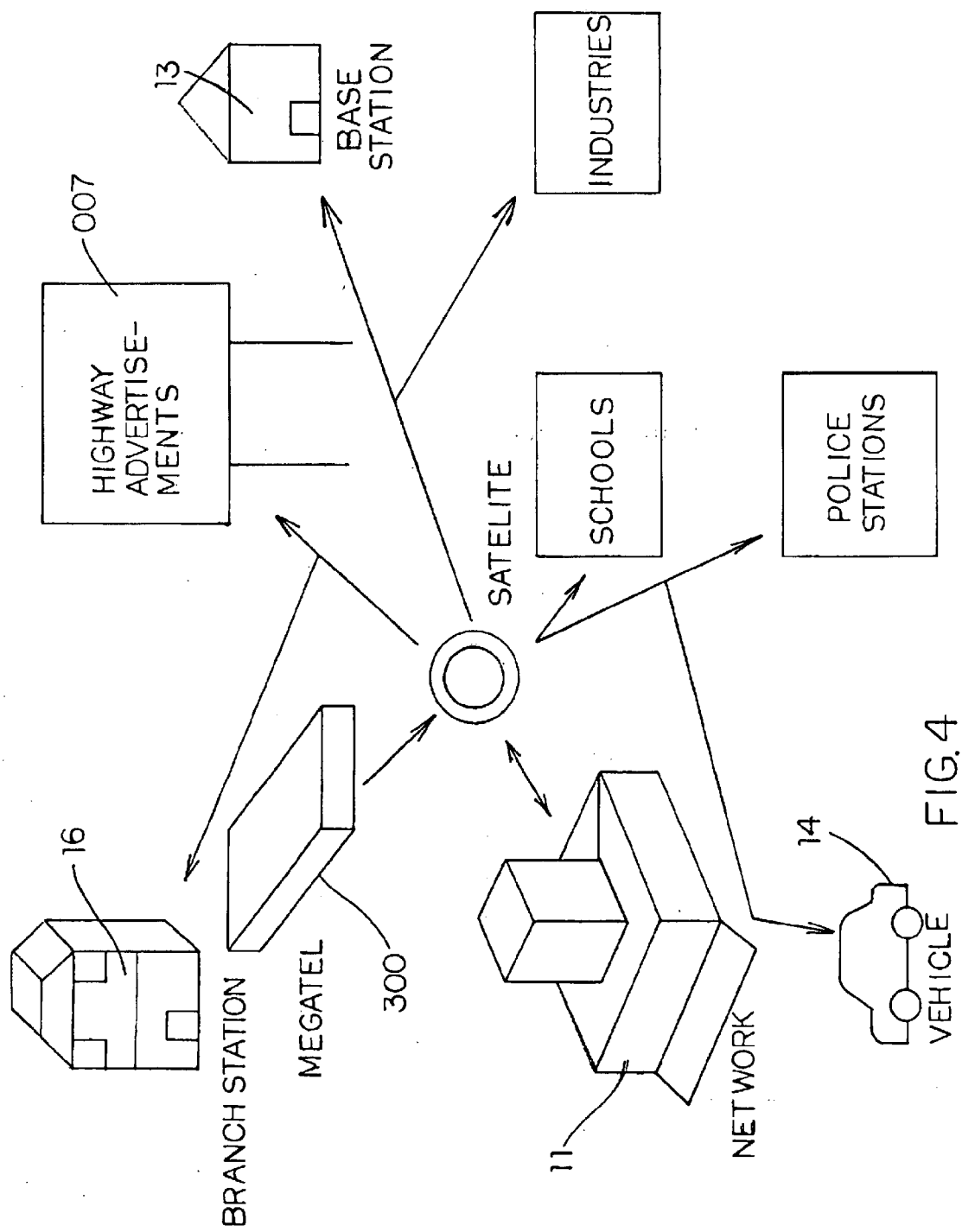
FIG. 4. is a drawing of the networking interface.
Figure 5:
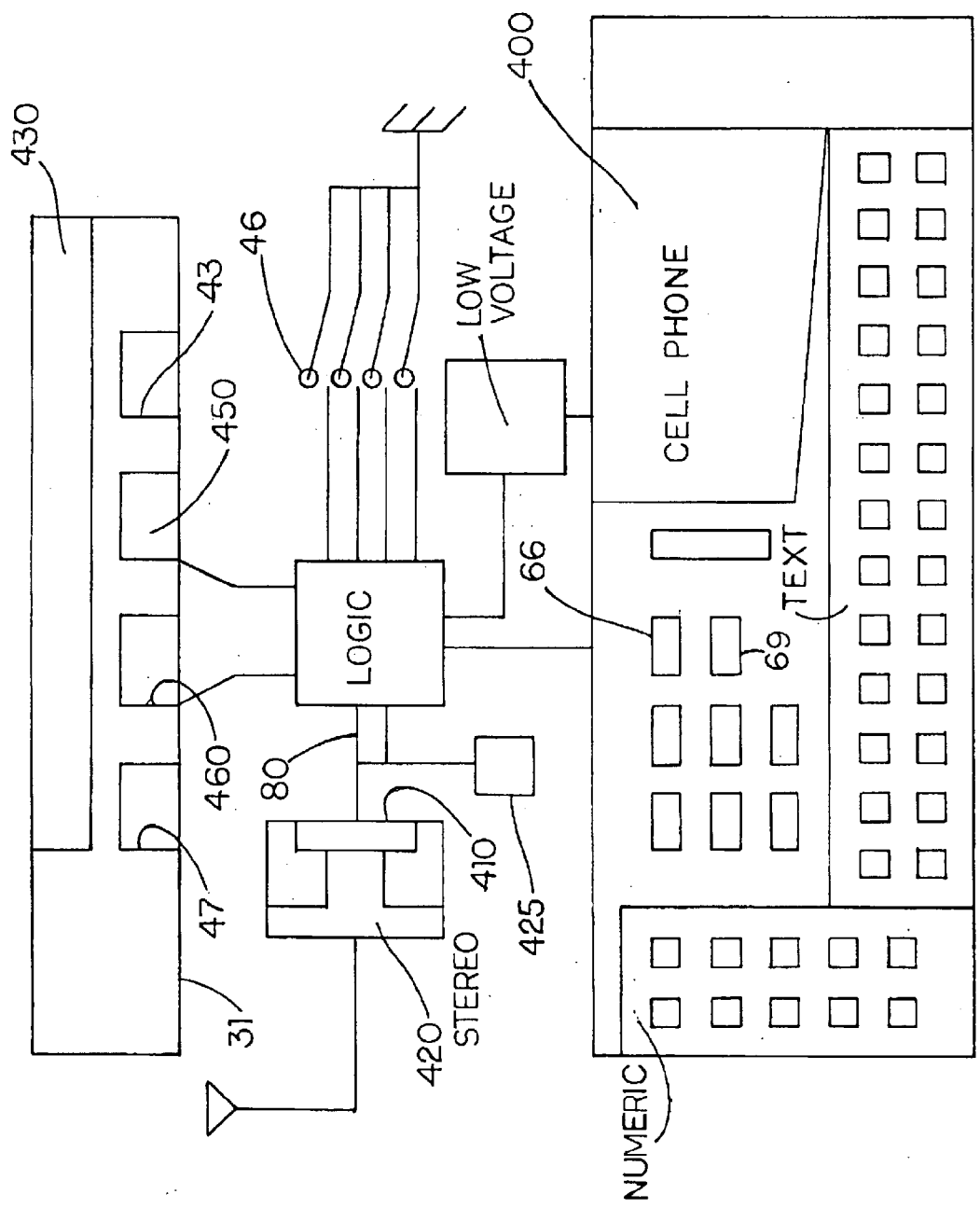
FIG. 5. is a circuit of the logical operation of different components.
Figure 6:
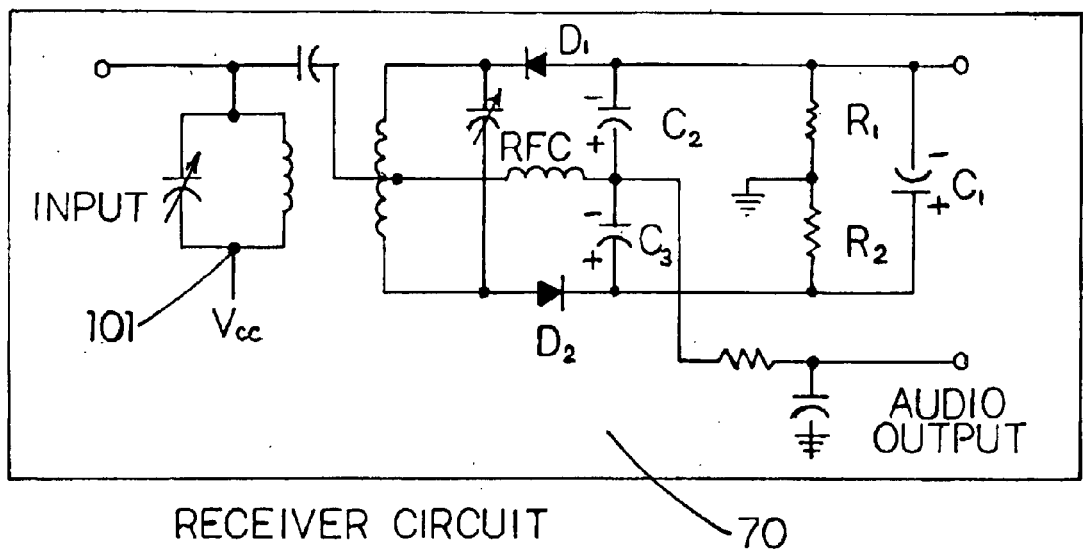
FIG. 6. is a circuit diagram of the receiver.
Figure 7:
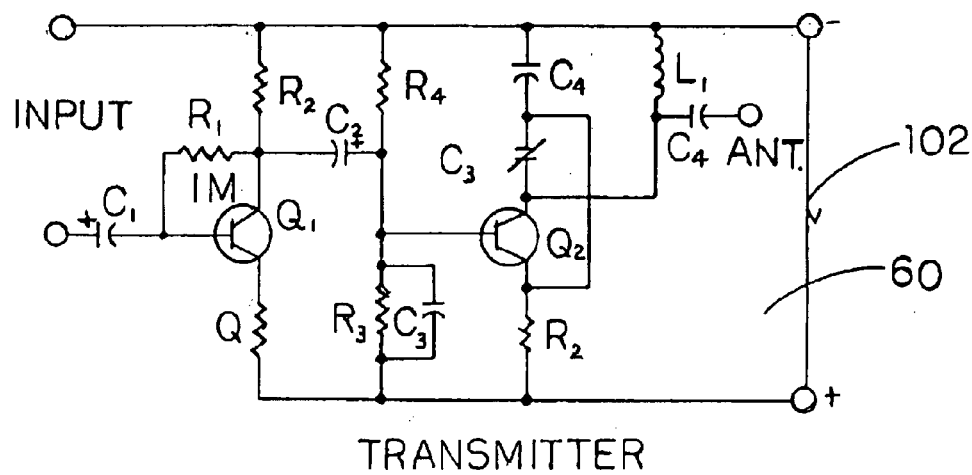
FIG. 7. is a circuit diagram of the transmitter.
Figure 8:
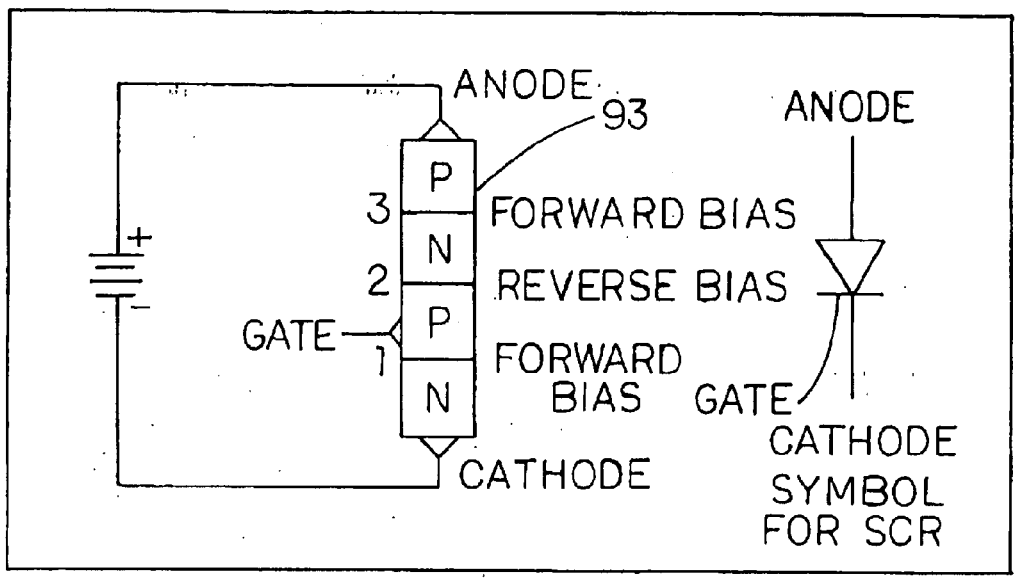
FIG. 8. is a block diagram and symbol for a silicon controlled rectifier.
Figure 9:
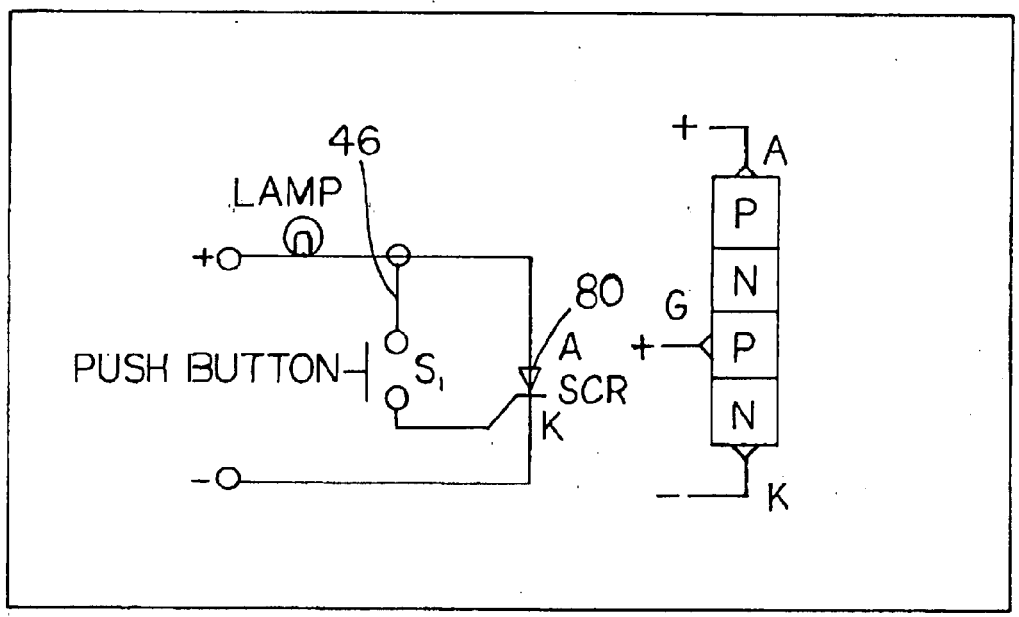
FIG. 9. is a diagram of the switching circuit of the controller.

A megatel communication system whereby referred to as a device comprising of a radio means, a cell phone means, a paging means, an Internet means, an Internet monitoring screen means. Whereby said added means transmits and receives signals in relation to a wireless megatel device (300), a hand's free safer cell phone communication means incorporated in a stereo and radio device. The megatel device (300) further comprises of a body (301), where inside the body are memories (220), input devices (230), exchangeable IC card (240), a controller (40), a display unit or monitoring screen (250), I/O terminals (01). The IC card (240) also includes a second memory (320), I/O terminal (03). Commands are processed in the megatel main body (301) and then passed on to the I/O (01). The modem (55) assumes commands when power is applied to the megatel device (300) to enable the controller (40) to then access and process all the commands and send to memory (220) and the monitoring screen (250). The controller (40) is of SCR and it access and process all commands in the command state as input, allowing the modem (55) to configure to various applications by utilizing the software program (116) and output from the megatel device (300), to the monitoring screen (250) and other external devices. The software program (116) permits other elements of the megatel device (300), like the cell phones (400), radio (410), the stereo (420), and the wireless Internet (430) means to be operative. It further allows processed and input data to be inputted and stored in memory (220) to enable output data to the monitoring screen (250). When a number is dialed, the controller (40) will inform the wireless radio fiber optic modem chip (115) inside the modem (55) to configure to the on-line state to enable transmission over the airwave and allow input from the airwave to be treated as receiving data or calls. The wireless radio fiber optic modem chip (115) is configured to enable the IC card (240) permit exchange of input and output of data from the megatel device (300) of one vehicle and be operative with the megatel device (300) of another vehicle. Allowing vehicular communication among vehicles with much tolerance to safety, and further advance safe driving, with improved communication between the drivers of the vehicles and the supper highway. The cell phone (400) is adoptive to the megatel device (300) through the inset slot (25), enabling hands free cell phone (400) usage when the vehicle is operative, and a vehicle to vehicle communication is further achieved when the IC card (240) is operative. By inseting the cell phone (400) in the inset slot (25) allows the input and output of the megatel body (301) and the input and output of the IC card (240) to read each other through direct connections. The IC card memory or ROM (320) is where all programs for operational data processing are stored to allow the RAM (340) to access said stored data through the line terminals (011). Processing data are stored in the ROM (320), including languages and software (116) and the like that invoke the RAM (340) to handle other functional and operational data that are unique to the intelligence of the megatel device (300). The body (301) of the megatel device (300) invokes the software program (116) and communication data through the line terminal (011) of the megatel device (300) and the IC card (240). Said programs and data are stored in the ROM (320) and the IC card (240) to allow wireless electronic communication between the megatel devices (300) and the like, by exchanging information in the IC cards (240) that are unique to the communication initiation. There is a second I/O terminal (02) at the megatel body (301) that allows data to be shared with other devices. The cell phone (400) uniquely employs an input device from a personal computer (11), a base station (13), and a branch station (16). When a call is transmitted, the radio (410) will communicate to the base station (13) through the radio waves, allowing the receiver (70) to absorb the emitted signal from the base station (13) to the branch station (16). The transmitted signals are in digital. When a call is transmitted from the base station (13), the antenna (10) will absorb or receive the signal and send to the mixer (35) for filtration. The signal produced by the oscillator (22) is also sent to the mixer (35) and amplified by the amplifier (33) before the signals are demodulated into digital signals by the demodulator (450). The demodulated signals are then sent to the CPU (425) for operational processing. The CPU (425) also process other calls such as selection calls to allow other communication means like road constructions, exit rams, advertisements, police chases and the like through the branch stations (16) to the megatel device (300). The branch stations transmission will then permit calls made within localized range to a receiver (70) in the said local state or city to be classified as a local call. Thereby limiting accumulation of cell phone bills and improving on road communication. In the case of vehicle to vehicle communication, when a call is made from a vehicle to another, when the tag number (14) is dialed, that information will be transmitted into characters and numeric strings, a digital 1/0 to the base station digital system. The tag number is inputted through the data input where it is then subjected to the operational processes in the CPU (425). With the fast growing concern about school safety, dialing the programmed school bus number or the programmed tag number of the school bus will allow communication between the school bus driver and parents. This will prevent and permit parents to always check the safety or the where about of their kids. The microprocessor (85) identifiers numbers, letters, and emit radiant energies through waves, demodulates the absorbed energy and modulate the emitted energy when the megatel device (300) is operative. The carrier detector (82) will then detect an open station. As the freed station is detected, the oscillating frequency of the branch station oscillator (22) will be enabled so that the carrier of the said frequency is controlled. The output from the oscillator (22) is then sent to the Electro-optical modulator (460) through electronic switches (46), to enable the transmitter (60) be switched to the transmission mode. When the transmitter (60) is on the transmission mode, the modulator (460) will then emit signals corresponding to the dialed tag number (14) or input information to be transmitted from the CPU (425), thereby allowing the carrier to respond in return to the modulation signal. The main amplifier (33) of the megatel device (300) will then amplify the power of the modulated signal and transmit the signal towards the base station (13) through the antenna (10). The base station (13) will then receive the transmitted data from the branch station (16) and allow communication between parties. The branch station (16) also receives information from the base station (13). When the transmitted signal from the base station is received by the antenna (10), the antenna switch (15) will allow the received signals to be amplified by the high frequency amplifier (33) and supplied to the mixer (35) for filtration. The demodulated data will then be supplied to the CPU (425) for operational processing. Whereby said operational processed data is stored in memory (220). The fiber optic modem chip (115) embedded inside the wireless radio modem (55), upon pushing on the Internet button (00), will then enable Internet transmission through radio frequencies or radio waves, by employing wireless Internet communication means for use in land, air and marine vehicles. Said wireless vehicular Internet communication means is for the purpose of employing all Internet activities and electronic wireless communication in vehicles without any interference with the steering wheel control. The unique features of the megatel device (300) distinguishes itself from automotive safety hazards by employing communicating means that is separable from the driver's steering wheel control apparatus. Uniquely, a number is dialed to a recipient telephone number. If the recipient was driving at the time of the call, with another megatel device in the vehicle of the recipient, communication will be enabled to allow hands free communication between the caller and the recipient through radio wave lines and the stereo speakers. By pushing on the Internet button (00) enables Internet connection, activation, and communication. When the Internet button (00) is pushed, the monitor screen (250) automatically will allow the viewing of all Internet activities. That is, the server (75) will allow the controller (40), the decoder (43), the encoder (47) and the wireless modem chip (415) to be operative and enable the Internet communication means. The controller (40) identifies all calls when they are made and also separate a ring indicator (74) from the Internet server (75) by allowing calls to be made irrespective of the Internet means. The tone encoder (66), the dialer (69), and the ring indicator (74) are associative and permissible that allow calls to come in and go out without any interference with the driving operation of the vehicle. The ring indicator (74) identifies calls and also allow the metal base sensors (360) of the cell phone (400) base to decode said calls so that the calls are made permissible over the radio means and the speaker means. Accordingly, the controller (40) checks the cell phones (400) and Internet activities and allows the hock-up controller (41) to connect all phone calls away from the server (75). After the calls are connected, they are then transferred and decoded from digital to analog, allowing dial tones or rings to be heard through the stereo speakers (001). When a call is made, the controller (40) will receive the phone number from the tone encoder (66) and decode the number to identify the destination country so that an appropriate receiver is enabled. When the server (75) is activated, the controller (40) will send the dialed phone number to the receiver (70) to enable a phone call operation or Internet networking. The receiver (70) and the transmitter (60) for the megatel device (300) will transmit and receive voice and data signals through wireless means. The server includes a memory that contains data relating to all departments of motor vehicle files. When a tag number of a closed-by vehicle is dialed, the server for the stored data from the department of transportation will be opened and the tag number will be activated distinguished for instant or frequent messaging. The ROM (320) stores all the tag numbers (14) for each state, and when the tag number is dialed, the decoder (43) will then compare the coded tag number to that of the ROM (320). If the matching signal is identical, the ROM (320) will then send the tag data to the CPU (425) that will then process and send to the base station (13) for transmission. The reflected signal or radiated signal is absorbed by the antenna (10) and received by the CPU (425). The CPU (425) controls the logic that allows wireless communications, data processing, and component interface. The computer program with its programmed code mechanism that is embedded in the computer storage medium will enable the computer means of the megatel device (300) to allow the frequency of the department of motor vehicle administration to be used as a dialing phone number medium. The tag number (14) being a predetermined phone number or emergency number, is associated with the regular phone number when an identification number or a private number code is added to the said tag number for the purpose of completing the required dialing number digits. By completing and dialing the required number digits and the area code will identify the state in which the recipient is based. The memory of the server (75) includes data that are shared among traffickers when an emergency is eminent. Thereby allowing easy means of communicating in the supper highway. The stored data are used as identification numbers, which are assigned to individual vehicle and modified for use as regular phone numbers. Plurality of the tag numbers could be dialed during police chase or emergency, by simply assigning a code to the direction of chase in question. The cell phone switch (002) allows the server (75) to allocate data that are coded and assigned as emergency numbers and phone numbers. That is, when the tag number (14) is dialed, the server (75) will look up the number in the data storage or memory (320) to determine the vehicle with which said tag number (14) is assigned to. The number with the identification code is then forwarded to the switch (02) for connection of the recipient. The fiber optic modem chip (115) and the microprocessor (85) transmit and receives signals and also programmed to dial a 911 or a home phone number when a collision is detected. The megatel communication system relates to a special Internet screen (250) for viewing and monitoring Internet accessed information. When a radio means is activated, the radio (410), CD player (440), cassette player (435) are enabled. When a cell phone signal is stimulated externally, an intense instruction is transmitted by the transmitter (60) to the megatel device (300), to impact a response through the radio speakers (001) by means of pausing the radio signals temporally while the cell phone (400) is operative or said cell phone signal is emitted. The emitting cell phone signal carries a low voltage (101) to empower the cell phone coded information, where said coded information enables the megatel device (300) to operate intelligently to allow exchange of information while advancing driving safety and also prevent driving negligence. The low voltage (101) of the line signal, when said signal is emitted, is the source voltage of the cell phone (400), and has a controlling means that monitors the voltage count to the preset voltage (102). The voltage counts output signals to a CPU (425) that control strings of events and allow the CPU's built in logic to inter-act between events of the megatel device (300) and the network. The low power consumption of the megatel device (300) initiate processed data to be transmitted through the wireless radio modem (55), to the server (75). The receiver antenna (10) will then receive the data or signals through the radio transmitter (60), while the radiation antenna (10) radiates the data or signals from the radio transmitter (60). All signals are reflected to the reflection circuit (105), in response to the processed data signals to enable the demodulator (450) to demodulate the received data or signals through the receiving antenna (10) that will output said demodulated data to the processing device of the megatel (300). Data are transmitted from IC card (240) to the megatel device (300) through radio transmission to enable vehicle to vehicle communication and the like, for the purpose of enhancing communication means to further improve driving safeties. The transmitted messages are coded by the source (31) and decoded by the receiver (70) to initiate dialing of the tag number dialing system. The controller (40) upon receiving data from the IC card (240) passes said data to the fiber optic modem chip (115), for the radio modem (55) so that the unmodulated carrier signal is radiated to the antenna (10). Signals are then transmitted through electrical impulses that are changed into sound waves and used to transfer, emit, and absorb the coded information. The impulses are changed to sound waves to enable the megatel device logic mode be operative so as to allow the accept button (47) be functionally operative to further advance the hands free communication behavior in other to reduce accidents caused by the usage of cell phones (400) while driving. When the send button (48) is utilized, electrical impulses is enabled to emit radiant energy through the antenna (10). Said radiant energy is for sending signals or dialing a recipient through the megatel device (300), without any interference with the steering wheel (004). Accordingly, the coded signal includes, but not limited to dialing a tag number (14) and a family code to complete a regular dialing system that allows a ten digit or eleven digit dialing. When the 411button (49) is pushed in, the microprocessor (85) will be enabled, allowing the directional software (116) to be in contact with the data base for the department of transportation, to further enable network services between transportation supper highway, the cops, and computers. The embedded chip (117), the fiber optic modem chips (115) and the Electro-optic modulator (460) enable translation of electrical signals to optical signals to enhance the wireless Internet services in vehicles. The embedded chip (117), the RAM (340), and the CMOS (370) are in operation with the megatel microprocessor (85), the fiber optic modem chips (115), and the Electro-optic modulator (460) to intelligently transmit and receive wireless Internet communication and other wireless cell phone (400) communications. The self-test chip (119) for the self-test button (44) checks the functionality of the components of the megatel device (300) each time the device is in operation. These devices allow the transmitter (60) to transmit to various destinations while the receiver (70) receives transmitted data and display said data through the monitor screen (250). The monitoring screen (250) is built in the sunviser (130), with electronic wires running through the sunviser base (131) to the megatel device output terminal so as to allow data to be displayed through the said monitor screen (250). When the tag number (14) is dialed, the microprocessor (85) will power the megatel device (300) to pick the radio or microwave signals in other to ascertain megatel communication. The megatel device (300) further allows cell phones (400) to be electrically charged by means of the contacts made between the coded metal base sensor (360) of the cell phone (400) and the second sensor (327) inside the megatel slot (25). The cell phone (400) is further connected to the megatel device cell phone slot (25) to allow the metal base sensor (360) of the cell phone (400) and the second sensor (327) of the megatel (25) to initiate contacts so that communication through the stereo (420) and the speakers (001) are ascertained. The megatel device (300) is transformed from a hand held cell phone to a hands free cell phone (400), when the cell phone (400) is inserted in the slot (25). When the cell phone (400) is in the slot (25), the metal base sensor (360) of the cell phone (400), and the second sensor (27) of the said megatel device (300), will read each other to ascertain communication through the stereo system (420) and audibly output through the speakers (001). The microprocessor (85), the fiber optic modem chips (115), with all the intelligence of the megatel device when programmed, enable the corps one push button (005) to allow communication between the corps and vehicles on the direction of the corps patrol. Together with the emergency 911button (30), the megatel device (300) facilitates connections to the nearest police station or police car for immediate emergency rescue. In other to allow other networks and businesses to advertise nationwide along the supper highway, pluralities of microprocessor (85) are programmed to enable communication between the advertising board (007) on the highway and the megatel device (300). Near by restaurants and other businesses along the perimeters of the supper highway, the gas stations and other lucrative areas are programmed to advertise and communicate with the said megatel device (300) to inform commuters about the said advertised businesses. The microprocessor (85) for the megatel device (300) enables the power antenna (10) to absorb or emit coded energies to initiate communication. The fiber optics used for the construction of the antenna (10) and the components of the megatel device (300), including the transmitter (60), and the receiver (70), transmits and receives wave signals from radio waves and microwaves by determining the amount of light traveling down the fiber. Said fiber optics will measure the amount of light traveling down the fiber or from one fiber to another in optical radiation. The optical properties change each time the fiber optic is exposed to other electrical data sources. That is, the speed of the light will remain constant when the voltage is removed from the modulator (460), and varies when the voltage is installed in the modulator (460), allowing the light wave to reinforce each other and create a 1 "bright". When the waves are out of phase, they will cancel out each other, creating a 0 "dark." Said modulation is laser-like modulated with the computerized electrical signals or impulses. The lights are switched from dark to bright, which represents OFF and ON, or 0's and 1's in digital information. The fiber optic modem chip (115) allows Internet activities to be enabled. The built-in amplifier (33) amplifies the microphone (306), which is embedded in the sunviser (130), which is adjustable to accommodate different drivers. The interface unit (95) is linked to the circuit board (94) to allow the system's control functions and memories to intelligently control functions of the microprocessors (85) and the network software (116). The fiber optic modem chip (115) is activated when the manual or automatic switch (200) for the wireless Internet is enabled, allowing corresponding pin interface to be communicative with other fiber optic modems (55) and server (75). Transmission to the modem (55) is synchronous, permitting the transmission time to be selected for internal and external or loop-back clock. This is then converted internally to synchronize the format in compliance with other standards for Internet usage. The transmitted data allows unmodulated signal to be received through the antenna (10). The antenna (10) receives radio waves transmission and transfers the transmitted signal to the megatel device (300). The megatel device (300) then receives and demodulates the signal to ascertain an output. Unmodulated carrier signal is modulated in response to the transmitted data, by diode (80), so as to reflect radiated signals to the radio modem (415), through the antenna (10). The diode (80) then will detect the received signals and supply the controller (40) with the detected signal that will then activate the amplifier (33) and amplify said signal through the stereo means to the speakers (001). The controller (40), upon receiving said signal, will also communicate with the CPU (425) to supply processing data to the carrier through line signals and also receive transmitted data through line signals from the demodulator (450). The CPU processed data are then supplied to the RAM (340) to enable modulation of the carrier response to the CPU transmitted data. The modulated signal is then sent to the bias (93) through line signals, to the decoder (43) that will then decode the received signals and output to the stereo speaker (001). Various mode (90) and buttons allow stored messages or emails to be received and transmitted to the monitoring screen (250). The monitoring screen (250), which is a liquid crystal display means that is built and housed inside the sunviser (130), for viewing of all wireless Internet related activities in vehicles, will display all transmitted data through its view window (131). Power and other input to the monitoring screen (250) are received through line connections into the pivotal hollow mounting base (05) of the sunviser (130), to the output of the screen (250). The megatel device (300) operates on low voltage, which is the electric source for the cell phone (400). When the cell phone signal is stimulated externally, the source voltage will refer to a preset voltage (102) that will logically allow signals to be received and further permit communication through the megatel device (300). Further, when the cell phone (400) is inserted in the slot (25), the radio means will be in operation while the said phone is paused for incoming or outgoing signal. When an Internet communication is enabled, the server (75) will receive Internet transmitted information or data and the receiver's monitoring screen (250) will display all the transmitted Internet data or information when activated, to further allow viewing of related data. Said monitoring screen (250) is positioned at the interior of the sunviser (130) and mounted atop the vehicle interior. The sunviser (130) is pivoted at a supporting base (05) to absorb vibration and is connected to a ball joint (06) to further allow permissible screen angle adjustment and relocation. The sunviser mounting base (05) and the monitoring screen (250) is pivotally moveable, and comprises of a cover (015), that covers the monitoring screen (250) when disabled, and electronically enable the screen when Internet transmission is eminent, while the mirror case (15) is an accessories for individual use. Intelligently, the megatel device (300) is built with semiconductor devices that allow higher scale of integration and functional intelligence with room for improvement of vehicular wireless Internet services, communications and the like. When the megatel device (300) is enabled and the Internet button pushed in, related data are activated and output into the monitor screen (250). Such data are stored and transferred to other PCs for later use. The logical circuitry for determining the sequences in which numeric assignments of numbers are differentiated from text character assignments are distinguished from the number counts. Numeric counts starts from 0 to 9 while the character counts starts from 10 to 35. The arrangement of the count is not absolute, as it could further be arranged in different applications and settings.

| DECIMAL | 0 | 1 | 2 | 3 | 4 | 5 | 6 | 7 | 8 | 9 |
|---------|---|---|---|---|---|---|---|---|---|---|
| BINARY | 0 | 1 | 10 | 11 | 100 | 101 | 110 | 111 | 1000 | 1001 |

| DECIMAL | TEXT CHARACTER | BINARY |
|---------|----------------|--------|
| 10 | A | 1010 |
| 11 | B | 1011 |
| 12 | C | 1100 |
| 13 | D | 1101 |
| 14 | E | 1110 |
| 15 | F | 1111 |
| 16 | G | 10000 |
| 17 | H | 10001 |
| 18 | I | 10010 |
| 19 | J | 10011 |
| 20 | K | 10100 |
| 21 | L | 10101 |
| 22 | M | 10110 |
| 23 | N | 10111 |
| 24 | O | 11000 |
| 25 | P | 11001 |
| 26 | Q | 11010 |
| 27 | R | 11011 |
| 28 | S | 11100 |
| 29 | T | 11101 |
| 30 | U | 11110 |
| 31 | V | 11111 |
| 32 | W | 100000 |
| 33 | X | 100001 |
| 34 | Y | 100010 |
| 35 | Z | 100011 |

When the numeric and text character dialing system is used for assigning cell phone (400) numbers for the megatel device (300), the numbers will be digitized and coded to turn on series of switches representing 0s and 1s in digital counting. The 0s and 1s are the number of bright light and dark, a representation of the change of optical properties when exposed to electrical data source. Numeric numbers and text characters are converted to binaries and coded to speed up the counting processes.

The invention is fully described by means of the specific embodiment but not limited to the following claims.

What is claimed is:

1. An entertainment device, comprising:
   a. a radio means responsive to normal radio wave transmission; a cell phone means adaptive to enable communication via said radio means; said radio means operatively enabling wireless Internet means via radio wave and microwave transmission;
   b. a CD device responsive to normal read only data, means for loading said data into other devices, adoptive for use in vehicles to enable entertainment and wireless transmission in response to said radio wave transmission;
   c. a controlling means operatively separating signals normal to the radio means, the cell phone means, and the wireless Internet means; including means for determining which of the plurality of the sensed signal is discrete; said discrete signal is based on the plurality of transmitted signals to the said discrete control zone;
   d. an antenna means responsively radiating, means for emitting and absorbing signals reflective to the receiving and transmitting of radio wave and microwave transmission:
   e. an amplifier receiving and amplifying signals common to the said device;
   f. a monitoring screen having an electronically operated screen cover;
   g. a data processing means for sensing and processing internet and related data, said monitoring screen having a built in speaker and microphone, said monitoring screen linearly and angularly being adjustable to adapt to different heights.

2. A communication device, as claimed in claim 1, wherein said cell phone includes a cell phone slot having readable sensors characterization compatibility adaptive to read said cell phone sensor in response to signals, said cell phone signal is enabled via stereo speakers.

3. A communication device, as claimed in claim 2, wherein said cell phone slot having sensors enables hands free communication audibly adoptive to the stereo device.

4. A communication device, as claimed in claim 1, wherein said CD device is responsive to a CD musical player.

5. A communication device, as claimed in claim 1, wherein said radio wave signal is responsive to Internet transmission.

6. A communication device, as claimed in claim 1, wherein said radio waves transport data to and from Internet means.

7. A wireless device as claimed in claim 1, wherein said monitoring screen is responsive for outputting processed and transmitted data.

8. A wireless device as claimed in claim 1, wherein the speakers and microphones are built in the monitoring screen to enable hands free communication.

9. A wireless device as claimed in claim 1, wherein said device having a screen monitoring means, pivoted and adjustable to different angles and heights.

10. A wireless communication means as claimed in claim 1, wherein said monitoring screen is housed inside the sunviser and mounted atop the roof.

11. A wireless communication device as claimed in claim 1, further comprising:
    a receiving means for receiving processed data via DMV server;
    means for assigning new phone numbers in reference to adopting a new number dialing method,
    means for communicating through plurality of vehicles with a single touch button.

12. A wireless communication device according to claim 11, wherein said device is communicative with a plurality of highway signs.

13. A wireless communication device according to claim 11, wherein a tag number is implemented as a cell phone number, responsive to a regular cell phone number dialing.

14. A wireless communication device as claimed in claim 11, whereby said device having a detecting means adoptive to communicating with other wireless devices in response to allowing communication between vehicles.

15. A wireless communication device as claimed in claim 11, whereby a plurality of microprocessors means communicative in response to advertising via said wireless device.

* * * * *